(12) United States Patent
Eisen et al.

(10) Patent No.: US 7,467,325 B2
(45) Date of Patent: Dec. 16, 2008

(54) PROCESSOR INSTRUCTION RETRY RECOVERY

(75) Inventors: Susan Elizabeth Eisen, Round Rock, TX (US); Hung Qui Le, Austin, TX (US); Michael James Mack, Round Rock, TX (US); Dung Quoc Nguyen, Austin, TX (US); Jose Angel Paredes, Austin, TX (US); Scott Barnett Swaney, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 11/055,258

(22) Filed: Feb. 10, 2005

(65) Prior Publication Data

US 2006/0179207 A1 Aug. 10, 2006

(51) Int. Cl.
*G06F 11/00* (2006.01)
(52) U.S. Cl. ........................................ 714/10; 712/227
(58) Field of Classification Search .................... 714/10, 714/11, 12, 23; 712/227
See application file for complete search history.

(56) References Cited

U.S. PATENT DOCUMENTS

| | | | |
|---|---|---|---|
| 3,736,566 A | | 5/1973 | Anderson et al. |
| 4,493,035 A | | 1/1985 | MacGregor et al. |
| 4,594,710 A | * | 6/1986 | Matsunoshita et al. ........ 714/34 |
| 4,912,707 A | | 3/1990 | Kogge et al. |
| 5,040,107 A | * | 8/1991 | Duxbury et al. ............. 712/216 |
| 5,241,636 A | * | 8/1993 | Kohn ......................... 712/215 |
| H1291 H | * | 2/1994 | Hinton et al. ................. 712/23 |
| 5,345,583 A | * | 9/1994 | Davis .......................... 714/23 |
| 5,361,267 A | * | 11/1994 | Godiwala et al. ........... 714/755 |
| 5,418,916 A | | 5/1995 | Hall et al. |
| 5,423,026 A | * | 6/1995 | Cook et al. .................. 714/23 |
| 5,446,851 A | | 8/1995 | Yamaguchi |
| 5,452,437 A | | 9/1995 | Richey et al. |
| 5,467,473 A | | 11/1995 | Kahle et al. |

(Continued)

OTHER PUBLICATIONS

Banâtre et al., "An Architecture for Tolerating Processor Failures in Shared-Memory Multiprocessors", IEEE Transactions on Computers, vol. 45, No. 10, pp. 1101-1115, Oct. 1996.*

(Continued)

*Primary Examiner*—Marc Duncan
*Assistant Examiner*—Joshua P Lottich
(74) *Attorney, Agent, or Firm*—Duke W. Yee; Diana L. Roberts-Gerhardt; Gerald H. Glanzman (57) ABSTRACT

Recovery circuits react to errors in a processor core by waiting for an error-free completion of any pending store-conditional instruction or a cache-inhibited load before ceasing to checkpoint or backup progress of a processor core. Recovery circuits remove the processor core from the logical configuration of the symmetric multiprocessor system, potentially reducing propagation of errors to other parts of the system. The processor core is reset and the checkpointed values may be restored to registers of the processor core. The core processor is allowed not just to resume execution just prior to the instructions that failed to execute correctly the first time, but is allowed to operate in a reduced execution mode for a preprogrammed number of groups. If the preprogrammed number of instruction groups execute without error, the processor core is allowed to resume normal execution.

12 Claims, 4 Drawing Sheets

U.S. PATENT DOCUMENTS

| | | | |
|---|---|---|---|
| 5,495,587 A | 2/1996 | Comfort et al. | |
| 5,502,826 A | 3/1996 | Vassilladis et al. | |
| 5,551,043 A | 8/1996 | Crump et al. | |
| 5,590,277 A | 12/1996 | Fuchs et al. | |
| 5,630,075 A | 5/1997 | Joshi et al. | |
| 5,664,137 A * | 9/1997 | Abramson et al. | 712/216 |
| 5,692,121 A | 11/1997 | Bozso et al. | 395/182.11 |
| 5,737,604 A * | 4/1998 | Miller et al. | 713/1 |
| 5,748,873 A * | 5/1998 | Ohguro et al. | 714/11 |
| 5,751,985 A | 5/1998 | Shen et al. | |
| 5,812,757 A * | 9/1998 | Okamoto et al. | 714/11 |
| 5,826,070 A | 10/1998 | Olson et al. | |
| 5,867,444 A * | 2/1999 | Le et al. | 365/230.06 |
| 5,872,948 A * | 2/1999 | Mallick et al. | 712/214 |
| 5,875,326 A | 2/1999 | Cheong et al. | |
| 5,884,061 A | 3/1999 | Hesson et al. | |
| 5,892,978 A | 4/1999 | Munguia et al. | |
| 5,923,832 A | 7/1999 | Shirakihara et al. | |
| 5,978,896 A | 11/1999 | Kahle et al. | |
| 5,996,083 A | 11/1999 | Gupta et al. | |
| 6,058,491 A | 5/2000 | Bossen et al. | |
| 6,289,428 B1 * | 9/2001 | Derrick et al. | 711/201 |
| 6,360,333 B1 * | 3/2002 | Jansen et al. | 714/25 |
| 6,363,475 B1 | 3/2002 | Dowling | |
| 6,393,582 B1 * | 5/2002 | Klecka et al. | 714/11 |
| 6,415,376 B1 | 7/2002 | Mohamed et al. | |
| 6,438,709 B2 * | 8/2002 | Poisner | 714/23 |
| 6,543,002 B1 * | 4/2003 | Kahle et al. | 714/10 |
| 6,553,480 B1 | 4/2003 | Cheong et al. | |
| 6,571,324 B1 * | 5/2003 | Elkington et al. | 711/162 |
| 6,625,749 B1 * | 9/2003 | Quach | 714/10 |
| 6,640,313 B1 * | 10/2003 | Quach | 714/10 |
| 6,718,483 B1 * | 4/2004 | Kimura | 714/10 |
| 6,738,926 B2 | 5/2004 | Mathiske et al. | |
| 6,751,756 B1 * | 6/2004 | Hartnett et al. | 714/54 |
| 6,834,358 B2 * | 12/2004 | Korenevsky et al. | 714/15 |
| 6,948,092 B2 * | 9/2005 | Kondo et al. | 714/12 |
| 7,055,060 B2 * | 5/2006 | Nguyen et al. | 714/11 |
| 7,096,322 B1 * | 8/2006 | Sollom et al. | 711/143 |
| 7,124,224 B2 * | 10/2006 | Tu et al. | 710/200 |
| 7,158,520 B1 | 1/2007 | Sindhu et al. | |
| 7,180,893 B1 | 2/2007 | Sindhu et al. | |
| 7,212,530 B1 | 5/2007 | Lim et al. | |
| 7,215,662 B1 | 5/2007 | Lim et al. | |
| 7,236,501 B1 | 6/2007 | Lim et al. | |
| 7,239,630 B1 | 7/2007 | Lim et al. | |
| 7,283,528 B1 | 10/2007 | Lim et al. | |
| 7,392,267 B2 | 6/2008 | Cragun et al. | |
| 2001/0042198 A1 * | 11/2001 | Poisner | 713/2 |
| 2003/0014736 A1 * | 1/2003 | Nguyen et al. | 717/129 |
| 2003/0061535 A1 * | 3/2003 | Bickel | 714/11 |
| 2003/0163763 A1 | 8/2003 | DeLano | |
| 2004/0024994 A1 | 2/2004 | Kurihara et al. | |
| 2005/0044311 A1 | 2/2005 | Lahiri et al. | |
| 2005/0050304 A1 | 3/2005 | Mukherjee et al. | |
| 2005/0149769 A1 * | 7/2005 | O'Connor et al. | 713/300 |
| 2006/0020851 A1 * | 1/2006 | Takahashi et al. | 714/11 |
| 2006/0047958 A1 * | 3/2006 | Morais | 713/166 |
| 2006/0143509 A1 * | 6/2006 | Okawa | 714/11 |
| 2006/0156177 A1 | 7/2006 | Kottapalli et al. | |
| 2007/0157138 A1 | 7/2007 | Ciolfi et al. | |
| 2007/0183425 A1 | 8/2007 | Lim et al. | |

OTHER PUBLICATIONS

Siewiorek, Daniel P., "Architecture of Fault-Tolerant Computers: An Historical Perspective", The Proceedings of the IEEE, vol. 79, No. 12, pp. 1710-1734, Dec. 1991.*

Janssens, Bob and Fuchs, W. K., "The Performance of Cache-Based Error Recovery in Multiprocessors", IEEE Transactions on Parallel and Distributed Systems, vol. 5, No. 10, pp. 1033-1043, Oct. 1994.*

Bishop et al., Method for Checkpointing Instruction Groups with Out-of-Order Floating Point Instructions in a Multi-Threaded Processor, Feb. 10, 2005.

Floyd et al., Mini-Refresh Processor Recovery as Bug Workaround Method Using Existing Recovery Hardware, Feb. 10, 2005.

Multiprocessing Checkpoint Retry, IBM Technical Disclosure Bulletin, Jul. 1971, vol. 14, issue 2, p. 358-361, NN7107358.

Chained Store Operations for Improved Main Store Performance, IBM Technical Disclosure Bulletin, Sep. 1990, US, vol. 33, issue 4, p. 284-286, NN9009284.

* cited by examiner

PROCESSOR INSTRUCTION RETRY RECOVERY

CROSS REFERENCE TO RELATED PATENT APPLICATIONS

The present application is related to co-pending application entitled "METHOD FOR CHECKPOINTING INSTRUCTION GROUPS WITH OUT-OF-ORDER FLOATING POINT INSTRUCTIONS IN A MULTI-THREADED PROCESSOR", Ser. No. 11/054,988, and application entitled "MINI-REFRESH PROCESSOR RECOVERY AS BUG WORKAROUND METHOD USING EXISTING RECOVERY HARDWARE", Ser. No. 11/055,823.

BACKGROUND OF THE INVENTION

1. Technical Field

The present invention relates to an improved data processing system. More specifically, the present invention is directed to a method, apparatus, and computer program product for recovering from transient errors in arrays and latches in and supporting a microprocessor by restoring registers to a known correct state earlier checkpointed for the processor and providing for directing processing to a service processor for certain errors.

2. Description of Related Art

A symmetric multiprocessing (SMP) data processing system has multiple processors that are symmetric such that each processor has the same processing speed and latency. An SMP system may be logically partitioned to have one or more operating systems that divide the work into tasks that are distributed evenly among the various processors by dispatching programs to each processor.

Modern micro-processors are usually superscalar, which means a single processor can decode, dispatch, and execute multiple instructions each processor cycle. These modern processors may also support simultaneous multi-threading (SMT), which means each processor can concurrently execute more than one software program (thread) at a time. An SMT processor typically has the ability to favor one thread over another when both threads are running on the same processor. Each thread is assigned a hardware-level priority by the operating system, or by the hypervisor in a logically partitioned environment. The Hypervisor may assist error correction by providing special handling to a microprocessor that has issued a machine check signal or a Hypervisor interrupt.

Static Random Access Memories (SRAM) have been susceptible to transient errors due to naturally occurring radiation for several generations of integrated circuits. As the scale of gates of various kinds has been reduced, even non-SRAMs, e.g. latches, have become susceptible to this problem. This phenomenon must be handled in order for further reduced size architectures to be useful and always correct when delivered to a customer in a processing device.

Also potentially problematic is contending with extremely rare sequences and combinations of instructions and states that invariably result in incorrect results each time such sequences and combinations occur. Typically, such so called 'functional errors' or 'bugs' would be discovered through intensive testing of a design prior to general availability. With extremely complex, superscalar, multi-threaded processors, used in incrementally scaleable large SMPs, with large numbers of virtual partitions, the verification state space approaches infinite. Validation of such a large state space often exceeds the capacity of formal verification tools and simulation test cases. Prototype hardware is typically manufactured for intensive testing at machine speeds, but unfortunately some mis-handled combinations of rare events may occur so infrequently that they are encountered very late or not at all during the prototype testing. Modifying and manufacturing additional prototypes to fix late found design bugs is expensive and time consuming, which may delay a product from reaching the market.

Often such design errors could be avoided by reducing the number and complexity of operations going on in the processor, thereby dramatically reducing the total state space, making the mis-handled combination of events more rare, or even impossible. Avoiding the use of complex superscalar pipelining techniques such as multiple instruction decode, dispatch, and execution; load and branch look-aheads; imprecise exception mode; pre-fetching; out-of-order processing, and simultaneous multi-threading (SMT) would reduce the total possible state space of a processor to a level where simulation tools would be adequate to ensure correct operation. However, modern processor throughput demands are such that dropping such techniques entirely would result in a commercially unviable processor. But it would be advantageous to temporarily suspend or disable such complex controls only when required to avoid a mis-handled combination of rare events. It is unknown in the prior art to forbear from using superscalar pipelining techniques and other modes (now considered normal) just so that a sequence of instructions which encounters erroneous operation can be retried successfully by avoiding combinations of rare events which resulted in the erroneous operation.

Increasing circuit density with new technologies is causing power consumption to become a limiting factor in microprocessor designs. In order to minimize power consumption, portions of the circuitry which are not required for a particular active operation are "turned off" by suppressing the clocks to them. Suppressing the clocks results in less circuit switching, and hence less power consumption. During periods of very low workload, large portions of the processor may be put into a low-power state, sometimes referred to as "nap" or "doze" modes. In the event of an error, where a prior checkpoint state is refreshed to the processor, the logic which is in the low-power state must be woken to allow it to also be reset and refreshed to the prior checkpoint state. This management of low-power states during processor recovery is not included in the prior art.

Virtualization of processors in large SMP systems requires efficient (fast) address translation to maintain throughput. A common technique to improve address translation performance is through the use of "look-aside" buffers which remember results from prior translations so they can be simply reused instead of recalculated. A look-aside buffer contains a relatively small number of entries, so after some time entries need to be discarded to make room for newer entries. If the result for a translation is not available in a look-aside buffer, it must be re-calculated through a series of memory accesses and additions. Once the first pointer to memory is known, hardware state machines can traverse a linked-list of address pointers to perform the translation. However, the first address pointer, which points to a storage "segment", cannot be determined by the hardware state machines. Segment pointers are managed by the operating system and hypervisor, and are stored in a Segment Lookaside Buffer (SLB) in the processor.

Unfortunately, the size of the SLB is such that it is prohibitively expensive to provide a backed-up copy of it within the processor chip die. Thus, in the event of any failure, a means to determine if the SLB contents were potentially corrupted and obtain and synchronize backed-up data is necessary, but not yet encountered in the prior art.

SUMMARY OF THE INVENTION

According to a preferred embodiment, the present invention operates on a processor core in a chip of a symmetric multiprocessing system, the chip having at least one processing core and a host firmware. A fault occurs during the processor core execution and is detected by error detection circuitry. Recovery circuits are woken from a low-power state by, e.g. clocking them. In addition, all other low-power circuits of the processor core are woken. Checkpointing of processor core state ceases as a determination is made if the state meets criteria for continued processing by the invention. The processor core is logically removed from the system, and reset. Values from the most recent checkpoint are stored back to all registers and architected facilities required to resume processing from the checkpoint. Logic which is in a low-power (e.g. clock off) state is woken (e.g. clocked) so that it can be reset and restored to the prior checkpoint state. The processor core is restored to the system. A high priority interrupt may occur in some instances, as the processor core is allowed to resume i-fetching and dispatch, albeit in a reduced execution mode. After a limited number of instruction groups process without error, the processor core is allowed to resume operating in normal mode.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Embodiments of the invention may provide an opportunity for a Hypervisor or firmware to remedy an error in a processor core when efforts of circuits in the chip housing the processor core have been exhausted.

We also provide an advantage in that we allow embodiments to retry instructions in a safer and more robust mode to avoid a functional error known to occur when operating in normal mode.

The present invention is a method, apparatus, and computer program product for handling errors in a processor core by using backed up register and buffer values in place of data known to be, at least in part, in error, e.g. as caused by random incident radiation.

Figure 1:
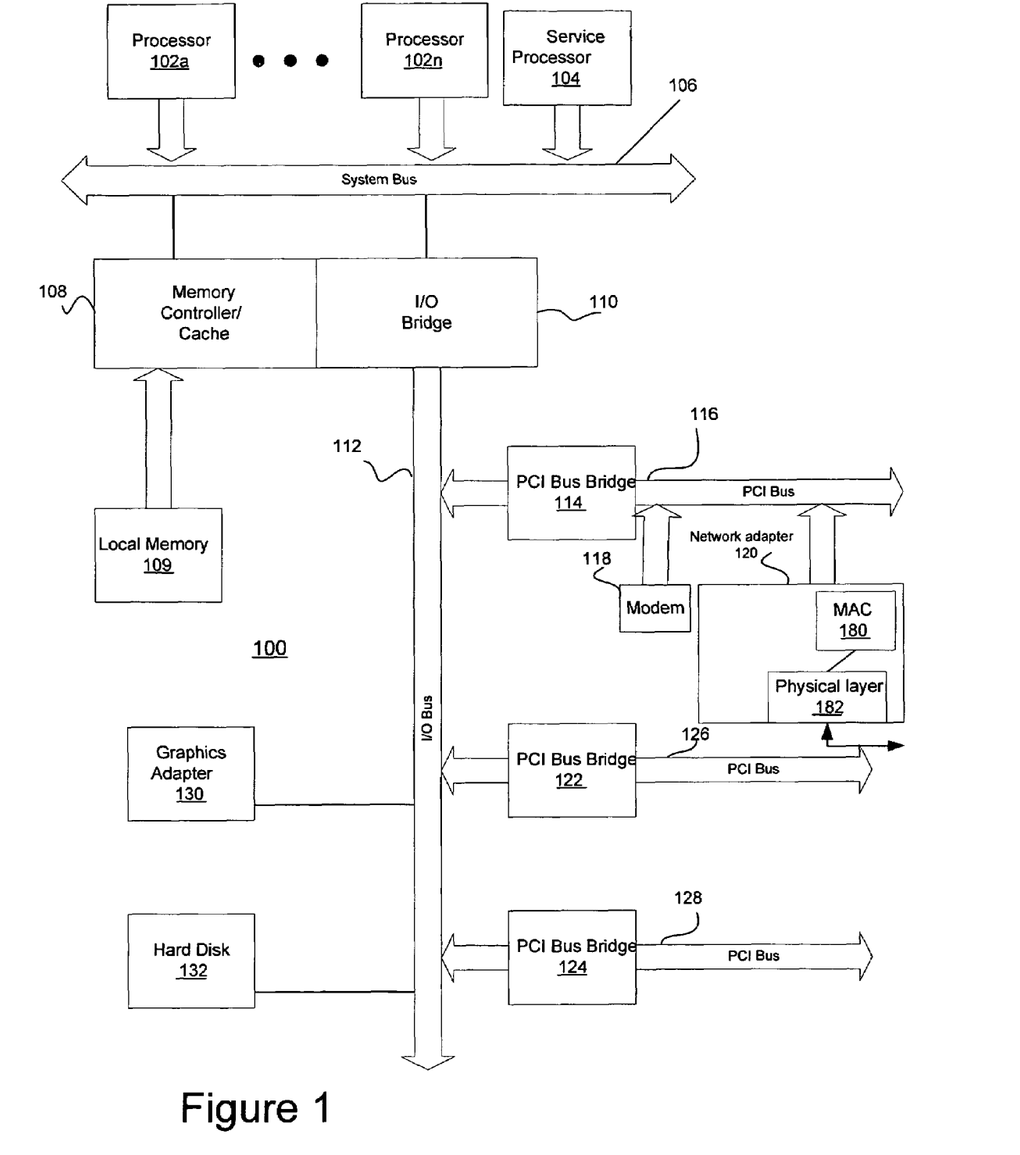
FIG. 1 is an exemplary block diagram of a data processing system in which the present invention may be implemented.

With reference now to the figures, FIG. 1 an exemplary block diagram of a data processing system in which the present invention may be implemented is depicted. Data processing system 100 may be a symmetric multiprocessor (SMP) system including a plurality of SMT-capable processors 102a-102n connected to System Bus 106. Alternatively, a single processor system may be employed. All of the processors described herein with reference to all of the figures are superscalar, SMT-capable processors. Each superscalar, SMT-capable processor is capable of concurrently executing multiple threads on the one processor with varied amount of resources allocated to each thread. Further, each thread will have assigned to it a hardware priority that the processor will use when determining what and how many of the superscalar resources and processing cycles to grant to a particular thread.

Also connected to System Bus 106 is Memory Controller/Cache 108, which provides an interface to Local Memory 109. Input/Output (I/O) Bus Bridge 110 is connected to System Bus 106 and provides an interface to I/O Bus 112. Memory Controller/Cache 108 and I/O Bus Bridge 110 may be integrated as depicted.

Peripheral Component Interconnect (PCI) Bus Bridge 114 connected to I/O Bus 112 provides an interface to PCI Local Bus 116. A number of modems may be connected to PCI Bus 116. Typical PCI Bus implementations will support four PCI expansion slots or add-in connectors. Communications links to network computers may be provided through Modem 118 and Network Adapter 120 connected to PCI Local Bus 116 through add-in boards.

Network Adapter 120 includes a Physical Layer 182 which conditions analog signals to go out to the network, such as for example an Ethernet network over an R45 connector. A Media Access Controller (MAC) 180 is included within Network Adapter 120. MAC 180 is coupled to Bus 116 and processes digital network signals. MAC 180 serves as an interface between Bus 116 and Physical Layer 182. MAC 180 performs a number of functions involved in the transmission and reception of data packets. For example, during the transmission of data, MAC 180 assembles the data to be transmitted into a packet with address and error detection fields. Conversely, during the reception of a packet, MAC 180 disassembles the packet and performs address checking and error detection. In addition, MAC 180 typically performs encoding/decoding of digital signals transmitted and performs preamble generation/removal as well as bit transmission/reception.

Additional PCI Bus Bridges 122 and 124 provide interfaces for additional PCI Buses 126 and 128, from which additional modems or network adapters may be supported. In this manner, data processing system 100 allows connections to multiple network computers. A memory-mapped Graphics Adapter 130 and Hard Disk 132 may also be connected to I/O Bus 112 as depicted, either directly or indirectly.

Service Processor 104 interrogates system processors, memory components, and I/O bridges to generate an inventory and topology understanding of data processing system 100. Service Processor 104 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by Service Processor 104.

System Bus 106 can be connected to one or more like system busses which allows the data processing system to be incrementally scaled up to a large n-way SMP.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention. The data processing system depicted in FIG. 1 may be, for example, an IBM e-Server pSeries system, a product of International Business Machines Corporation in Armonk, N.Y., running the Advanced Interactive Executive (AIX) operating system or LINUX operating system.

Figure 2:
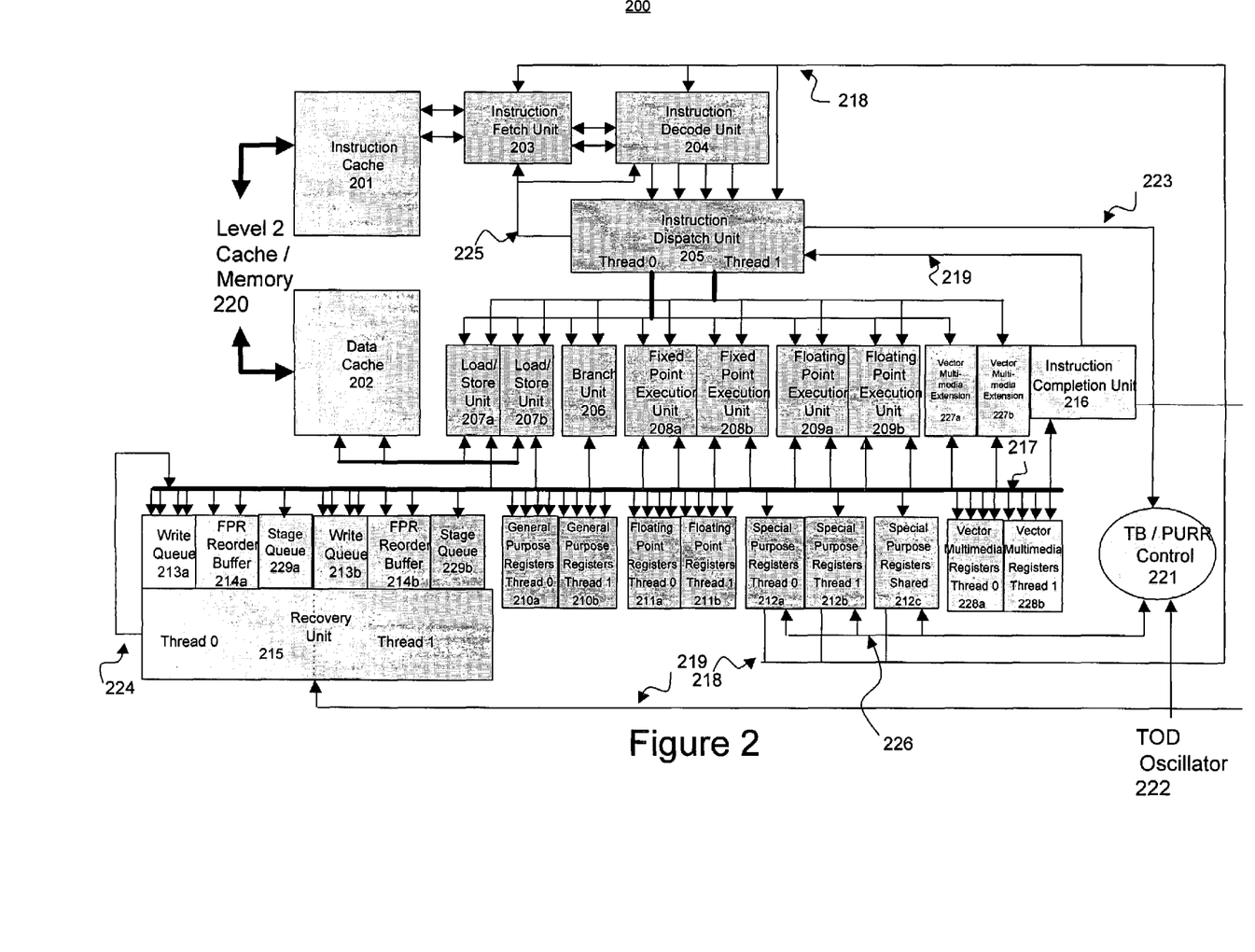
FIG. 2 is an exemplary block diagram of a dual threaded processor design showing functional units and registers in accordance with a preferred embodiment of the present invention.

Referring to FIG. 2, an exemplary block diagram of a dual threaded processor design showing functional units and registers in accordance with a preferred embodiment of the present invention is shown. The processor is generally designated by reference number 200, and may be implemented as one of processors 102a-102n in FIG. 1. Processor 200 comprises a single integrated circuit superscalar microprocessor with dual-thread SMT. Accordingly, as discussed further herein below, processor includes various units, registers, buffers, memories, and other sections, all of which are formed by integrated circuitry. Also, in a preferred embodiment of the present invention, processor 200 operates according to reduced instruction set computer ("RISC") techniques.

As shown in FIG. 2, Instruction Fetch Unit 203 (IFU) is connected to Instruction Cache 201. Instruction Cache 201 holds instructions for multiple programs (threads) to be executed. Instruction Cache 201 also has an interface to Level 2 Cache/Memory 220. IFU 203 requests instructions from Instruction Cache 201 according to an instruction address, and passes instructions to Instruction Decode Unit 204. In a preferred embodiment of the present invention, IFU 203 can request multiple instructions from Instruction Cache 201 for up to two threads at the same time. Instruction Decode Unit 204 decodes multiple instructions for up to two threads at the same time and passes decoded instructions to Instruction Dispatch Unit 205 (IDU). IDU 205 selectively groups decoded instructions from Instruction Decode Unit 204 for each thread, and outputs a group of instructions for each thread to execution circuitry 206, 207a, 207b, 208a, 208b, 209a, and 209b of the processor.

In a preferred embodiment of the present invention, the execution circuitry of the processor may include, Branch Unit 206, Fixed-Point Execution Units 208a (FXUA) and 208b (FXUB), Load/Store Units 207a (LSUA) and 207b (LSUB), and Floating-Point Execution Units 209a (FPUA) and 209b (FPUB). Execution units 206, 207a, 207b, 208a, 208b, 209a, and 209b are fully shared across both threads. The processor includes multiple register sets 210a, 210b, 211a, 211b, 212a, 212b, and 212c separately for each of the two threads, namely General Purpose Registers 210a and 210b (GPR), Floating-Point Registers 211a and 211b (FPR), and Special Purpose Registers 212a and 212b (SPR). The processor additionally includes a set of SPRs 212c which is shared across both threads. Simplified internal bus structure 217 is shown to depict connections between execution units 206, 207a, 207b, 208a, 208b, 209a, and 209b and register sets 210a, 210b, 211a, 211b, 212a, 212b, and 212c.

FPUA 209a and FPUB 209b input their register source operand information from and output their destination register operand data to FPRs 211a and 211b according to which thread each executing instruction belongs to. FXUA 208a, FXUB 208b, LSUA 207a, and LSUB 207b input their register source operand information from and output their destination register operand data to GPRs 210a and 210b according to which thread each executing instruction belongs to. A subset of instructions executed by FXUA 208a, FXUB 208b, and Branch Unit 206 use SPRs 212a, 212b and 212c as source and destination operand registers. LSUA 207a and LSUB 207b input their storage operands from and output their storage operands to Data Cache 202 which stores operand data for multiple programs (threads). Data Cache 202 also has an interface to Level 2 Cache/Memory 220.

Level 2 cache 202 may also have (not shown) associated with it a non-cacheable unit (NCU) which accepts load/stores from the processor and forwards directly to memory 220, thus bypassing the coherency protocols required for storage to cache. Memory 220 could also be memory-mapped registers or resource.

In response to the instructions input from Instruction Cache 201 and decoded by Instruction Decode Unit 204, IDU 205 selectively dispatches the instructions to execution units 206, 207a, 207b, 208a, 208b, 209a, and 209b. Execution units 206, 207a, 207b, 208a, 208b, 209a, and 209b execute one or more instructions of a particular class of instructions. For example, FXUA 208a and FXUB 208b execute fixed-point mathematical operations on register source operands, such as addition, subtraction, ANDing, ORing and XORing. FPUA 209a and FPUB 209b execute floating-point mathematical operations on register source operands, such as floating-point multiplication and division. LSUA 207a and LSUB 207b execute load and store instructions which move operand data between Data Cache 202 and registers 210a, 210b, 211a, and 211b. Branch Unit 206 executes branch instructions which conditionally alter the flow of execution through a program by modifying the instruction address used by IFU 203 to request instructions from Instruction Cache 201.

IDU 205 groups together decoded instructions to be executed at the same time, depending on the mix of decoded instructions and available execution units 206, 207a, 207b, 208a, 208b, 209a, and 209b to perform the required operation for each instruction. For example, because there are only two Load/Store Units 207a and 207b, a maximum of two Load/Store type instructions may be grouped together. In a preferred embodiment of the present invention, up to seven instructions may be grouped together (two Fixed-Point arithmetic, two Load/Store, two Floating-Point arithmetic, and one Branch), and up to five instructions may belong to the same thread. IDU 205 includes in the group as many instructions as possible from the higher priority thread, up to five, before including instructions from the lower priority thread. Values in Special Purpose Registers 212a and 212b indicate thread priority 218 to IDU 205.

Instruction Completion Unit (ICU) 216 monitors internal bus structure 217 to determine when instructions executing in execution units 206, 207a, 207b, 208a, 208b, 209a, and 209b are finished writing their operand results. Instructions executed by Branch Unit 206, FXUA 208a, FXUB 208b, LSUA 207a, and LSUB 207b require the same number of cycles to execute, while instructions executed by FPUA 209a and FPUB 209b require a variable, and a larger number of cycles to execute. Therefore, instructions which are grouped together and start executing at the same time do not necessarily finish executing at the same time. When all the instructions grouped together within a thread are finished writing their operand results, the group is said to be "completed".

Instruction Completion Unit 216 monitors for the completion of instruction, and sends control information 219 to IDU 205 to identify that more groups of instructions can be dispatched to execution units 206, 207a, 207b, 208a, 208b, 209a, and 209b. IDU 205 sends control information 225 to IFU 203 and Instruction Decode Unit 204 to indicate that it is ready to receive more decoded instructions.

Processor 200 preferable also includes error detection circuitry (not shown on FIG. 2) throughout all functional units, and Recovery Unit 215 which contains a backup copy of registers 210a, 210b, 211a, 211b, 212a, 212b, and 212c for both threads. Results written to register sets 210a, 210b, 211a, 211b, 212a, 212b, and 212c are also written to queue structures 213a, 213b, 214a, and 214b over internal bus structure 217. Register results from Branch Unit 206, FXUA 208a, FXUB 208b, LSUA 207a, and LSUB 207b are held in Write Queue 213a and 213b according to which thread the associated instruction belongs to. Write Queue 213a and 213b for each thread is a simple First-In-First-Out (FIFO) queue structure. Because instructions executed by FPUA 209a and FPUB 209b require a variable, and a larger number of cycles to execute, these results are written to FPR Reorder Buffer 214a and 214b according to which thread the associated instruction belongs to. FPR Reorder Buffer 214a and 214b arranges for each thread the results from FPUA 209a and FPUB 209b in the sequence which the associated instructions occurred in the program originally supplied by Instruction Cache 201.

The register results are held in Write Queue 213a and 213b and FPR Reorder Buffer 214a and 214b for each thread until Completion Unit 216 indicates (via control 219) that all instructions in the group have completed for each thread. If no errors are reported by the error detection circuitry (not shown in FIG. 2), the results are drained from queue structures 213a, 213b, 214a, and 214b into the backup copy of the associated registers in Recovery Unit 215. In the event of an error, Recovery Unit 215 discards the contents of Write Queue 213a and 213b and FPR Reorder Buffer 214a and 214b for each thread, and restores the backup copy of register sets 210a, 210b, 211a, 211b, 212a, 212b, and 212c using internal bus structure 217. Processing may then be resumed from the known error-free instruction boundary. The process of accumulating sets of register updates until a known good boundary, then copying these sets to backup registers is known as checkpointing. There may be several such sets of register updates stored in recovery unit queues 213a, 213b and buffers 214a, and 214b, and each set may be copied to associated backup registers on a set basis, wherein each successive set represents all updates to the state of the registers after processing each group of instructions, wherein the backup register values after updating by each set is known as a checkpoint.

Some of SPRs 212a, 212b, and 212c hold information used to control the operation of the various functional units. This is represented, simplified, in FIG. 2 by connection 218. SPRs 212a and 212b have separate copies for each thread, while 212c is shared across all threads. Not limited to these examples, SPRs 212a, 212b, and 212cmay include instruction addresses, thread priority control, condition code, save/restore addresses, machine state, et cetera.

Recovery unit 215 includes control logic (not shown in FIG. 2) for managing the checkpoint boundary, and hence operation of Write Queue 213 and FPR Reorder Buffer 214. Recovery Unit 215 also includes logic which controls the recovery sequencing and restoration of the checkpoint to register sets 210, 211, and 212 via bus structure 217 in the event of a reported error. This logic includes a state machine for sequencing further described with reference to FIG. 3A and FIG. 3B, and counters to measure out a quantity of instruction groups to be performed in a reduced performance mode, i.e. a checkpoint counter. In addition a register or counter known as a recovery counter may be implemented to control and measure progress of the recovery method of the invention.

Scattered among the units and registers of processor core 200, are a number of circuits which implement functions known as pervasives, which includes (but not limited to) controlling clocking for low-power states, collection of reported errors, interface to service processor, and control signals to override the normal superscalar, pipelined, Simultaneous Multi-Threading (SMT) operation of their host units and placing their respective hosts into a recovery mode.

Figure 3A:
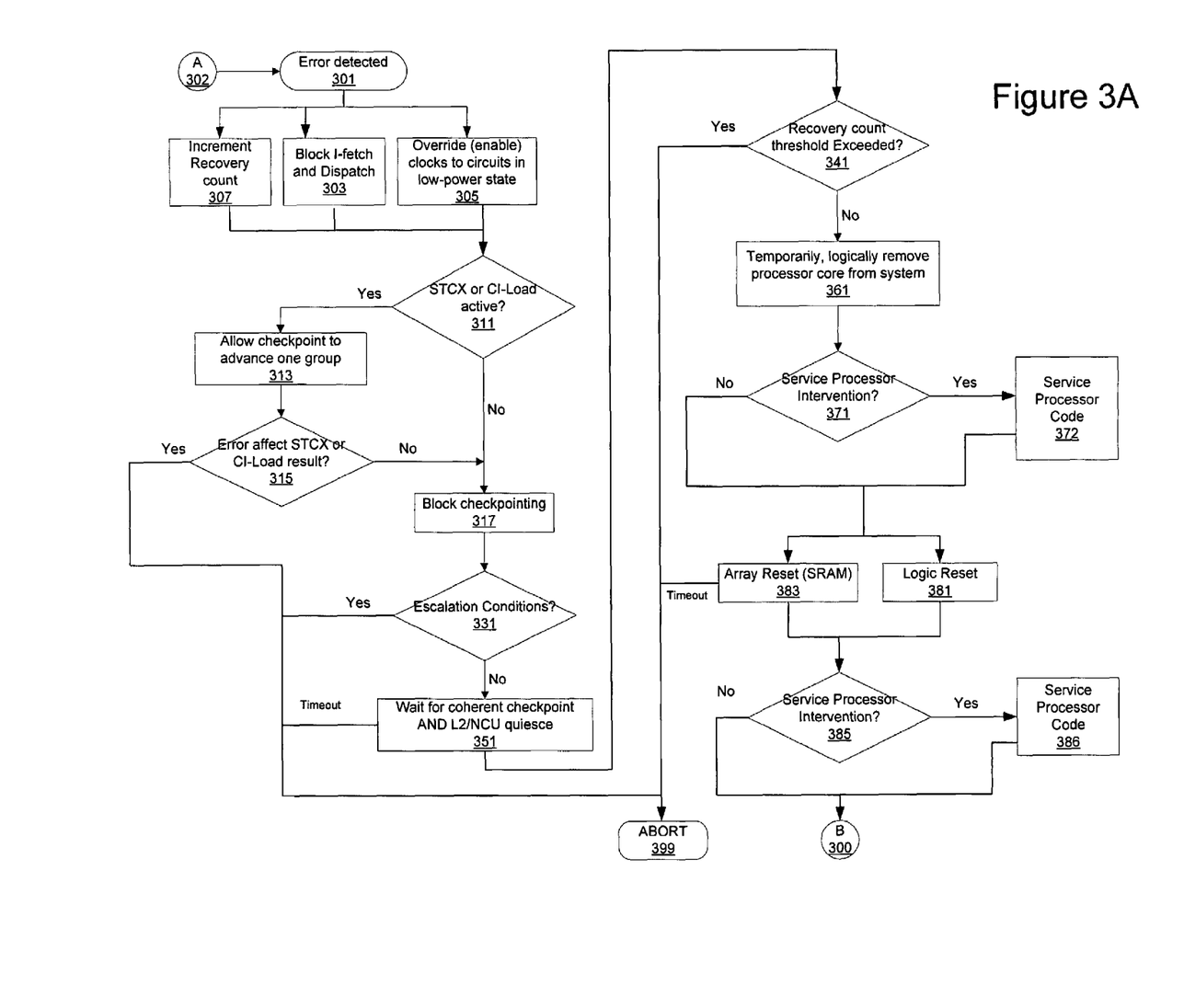
FIG. 3A is a flow diagram of steps taken in a chip to correct for an error occurring on a processor.

FIG. 3A shows a flow diagram setting forth the steps that occur during recovery from an error. At the outset of detecting an error 301, a clock signal is enabled to any circuits of the processor chip which may be in a low-power state (step 305), including recovery circuits, bringing such circuits out of a low-power state. These circuits that are 'woken' or given clock signals now, are known as formerly low-power circuits. By providing a clock signal to these circuits, signals may be provided to and observed by the affected processor core that halt normal execution so that recovery may be attempted and erroneous processor instructions corrected. A recovery count (step 307) is incremented to limit, in a reasonable manner, different attempts to correct the error or errors of the processor of FIG. 2. A pre-programmed recovery threshold may be set that controls the number of times that errors may force a renewed attempt to recover through link "A" 302. Nearly simultaneous with these steps, a signal may be driven (step 303) from recovery unit 215 to block instruction fetching at IFU 203, and also to block instruction dispatching at instruction dispatch unit 205. The steps of enabling circuits in low-power state, blocking i-fetching and dispatch and incrementing recovery count may occur in series or in tandem.

Because store conditional (STCX) and cache-inhibited load (CI-Load) are long duration instructions which modify state outside of the processor core prior to their completion, once started they must be allowed to complete and reach the checkpointed state. Thus it may be necessary to wait several clock cycles for off-chip circuits to respond with signals concerning the completion of such instructions. Thus an affirmative branch of the active long duration instruction (step 311) by the recovery unit causes the recovery unit to allow the advancement of the checkpoint (step 313) to include the STCX or CI-Load instruction. Instruction grouping rules in the instruction dispatch unit (205 from FIG. 2) guarantee that such instructions are alone in a group with older instructions already checkpointed, so that once started the checkpoint need only advance 1 group to include such instructions.

Since, for long duration instructions, STCX and CI-Load, the checkpoint may be allowed to advance after an error is detected, errors which may affect the results of such instructions are isolated from other errors which would not. In the context of error recovery, the term 'may' means there is a possibility, generally uncontrollable by the user or device, that the error produce an incorrect result. The uncertainty can be caused by faulty error detection, rather than a fault in the tested circuit itself, among other things. Recovery unit 215 of FIG. 2 examines these isolated errors to determine if the error adversely affected the STCX or CI-load result (step 315) which may have then contaminated the checkpointed register values. If so, the routine aborts 399 and ends in a checkstop, i.e. halt all processing of the processor core and isolate errors that may have contaminated STCX or CI load result. If the error fails to contaminate the long duration instruction result, the checkpoint is established at the conclusion of the STCX or CI-load, and continuing checkpointing is blocked (step 317).

Similarly, had there been an absence of STCX or CI-load operations active (step 311), execution of the recovery routine would flow directly to checkpoint blocking (step 317) of the processor core.

Recovery unit 215 may wait for the write queue to be drained up to the checkpoint boundary. Once recovery unit 215 advances the checkpoint and has a group tag (gtag) which identifies the instruction at the boundary of the checkpoint, recovery unit sends the gtag to ICU 216. ICU has access to a next instruction address (NIA) and may discover an error— thus signaling the status to recovery unit. Recovery unit may checkstop 399 since a faulty NIA may be an escalation condition (step 331). Other conditions may also trigger an escalation (step 331) which aborts recovery ending in checkstop 399. Errors which may compromise the integrity of the checkpointed values or the NIA are isolated from other errors so that they can be observed by decision block (step 331).

In very generalized terms, a "quiescing" is an attempt to slow and stop various side processes so that, in this case, recovery can progress with the least amount of confusion, i.e. to temporarily disable, even by letting processes expire. In the absence of an escalation condition, recovery unit may wait a timeout period to detect a quiesce occurrence of the NCU and L2. The recovery sequence suspends operation of the processor for some time, so to ensure no operations elsewhere in the SMP system are dependent on a response from the processor, the interface to the L2 and NCU is quiesced.

A quiesce condition (step 351), also known as quiescing the cache functional unit, may occur following five events: 1) LSU 207 allows any checkpointed store data remaining in its store queue to drain past the private L1 data cache 202 to the shared L2 cache; 2) L2 writes all store data sent from the processor into the cache; 3) any outstanding memory access (fetch) requests from the processor finish, but are dropped; 4) processor signals the L2 and NCU to stop sending any new invalidate commands which require responses from the processor; and 5) processor sends an invalidate response in case there was an active invalidate command waiting for a response. After these 5 steps, the L2 and NCU should not be waiting for any response from the processor or processing any operations on behalf of the processor, so is said to be idle. The idle condition is indicated to the processor. Gaps between commands during periods of low activity can result in occasional cycles where the interface is idle, but once idle for many (e.g. 256) consecutive cycles, the interface is said to be quiesced. Failure to detect a quiesced condition within the preprogrammed timeout results in checkstop 399. Otherwise recovery attempts to continue unless a recovery count threshold is exceeded (step 341), which may result in a checkstop 399. The recovery count threshold is not checked until after the coherent checkpoint has been established and the L2 and NCU interfaces quiesced, as waiting for this state allows for easier system-level recovery actions, such as alternate processor recovery, which are beyond the scope of this invention.

Absent a recovery count threshold being exceeded, pervasives circuits may logically remove the processor core from the system (step 361). This step may occur by gating off (fencing) the interface to L2 cache, NCU and memory 220 of FIG. 2, thus removing the processor core from the shared symmetric multiprocessing system resources.

Extensive prototype testing may identify specific error conditions which require Service Processor firmware to aid in the recovery process by overriding settings or parameters not directly controlled by the recovery state machine circuitry. If any such cases are found to exist, a configuration setting may be selected at boot time to indicate service processor intervention is required. At this time, if service processor intervention is required (step 371) an interrupt is presented to the Service Processor by the recovery logic. The service processor (SP) may then observe the state of various registers and latches throughout the processor via scan communication (SCOM), or level sensitive scan design (LSSD) scanning, to determine which if any predetermined circumstances exist which require additional support. If required, SP takes over processing (step 372) by means known in the art. Scan communication techniques are known from US patent application publication No. US 2004/0215929 "Cross-chip communication mechanism in distributed node topology".

If extensive testing shows that service processor intervention is not required for any special cases, the interrupt may be disabled such that decision (step 371) is never answered yes. Once the service processor completes its handling of the condition, or if none was required, the recovery unit may reset the contents of arrays in the processor, such as the instruction fetch cache 201 and the data cache 202, by using Array Built-In Self Test (ABIST) circuitry integrated with each array design. All arrays in the processor except for the segment look-aside buffer are reset. Collectively the resetting of arrays is known as array reset (step 383), and must complete within a preprogrammed time period or the recovery unit will place the core processor in checkstop 399. Alternatively, the recovery logic may reset latches in the processor core. Because there is no backup for the SLB which is directly accessible by the recovery logic, the SLB is left intact. Errors which may corrupt the SLB contents must be isolated from other errors, and the corruption indicated to firmware and operating system when processing resumes. An error is a state where one or more latches, registers or other storage devices contain an incorrect datum, or where a switching device, e.g. a transistor, fails to switch within a specified time of an input reaching a specified value, or a circuit opening or closing due to mechanical, or other forces well known in the art as broken.

Roughly concurrent with the array reset, logic resets are activated to restore various logic circuits to a known default state (step 381). Some logic circuits may reset in stages or concurrently. Various mechanisms for resetting logic latches are known, not limited to asynchronous latch reset inputs, activating LSSD scan clocks to "flush" a constant value through scan chains, combinatorially gating a value on data inputs, and initiating a state machine to provide pre-determined values or select values from an alternate source. Our preferred embodiment uses a combination of such known mechanism for resetting logic latches to a known error-free state. Error collection registers which combine reported errors from throughout the processor to report them to the recovery logic are also cleared by the logic reset.

Another opportunity for the SP to conduct special handling occurs (step 385). Again, if intervention may be required, an interrupt is presented to the SP. The SP analyzes the processor state via SCOM or scan operations, and applies any necessary predetermined modifications (step 386).

Figure 3B:
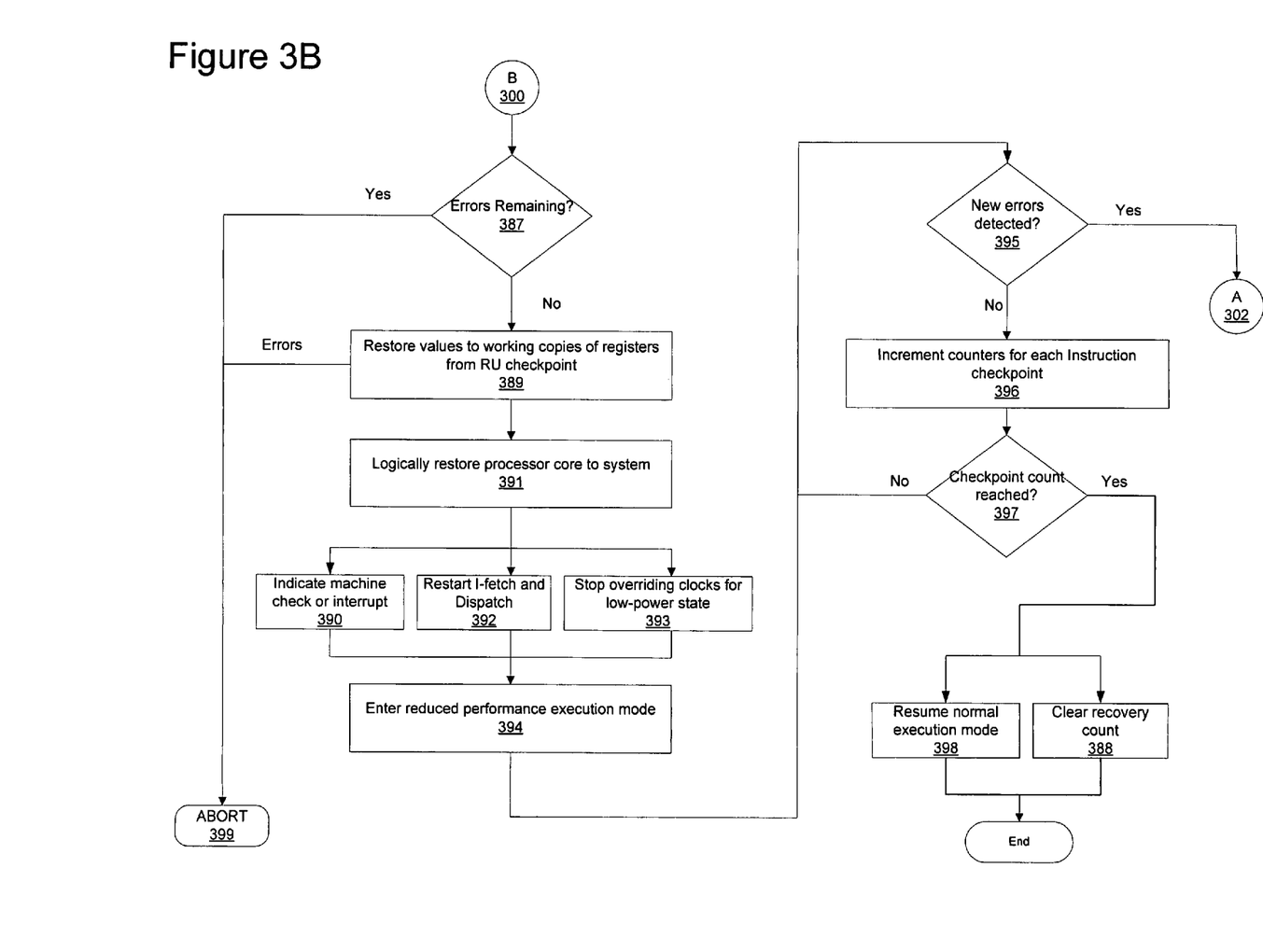
FIG. 3B is a continuation flow diagram of steps taken in a chip to correct for an error occurring on a processor.

FIG. 3B continues execution from FIG. 3A. At this point, any reported errors should have been cleared by the resets. If errors have again accumulated in the error reporting registers (step 387), an affirmative branch brings the core processor to checkstop. A negative result invokes an iterative writing of each register backed-up to the nearest checkpoint into the working registers of the processor (step 389), collectively such writes are known as restoring the nearest checkpoint to the processor.

Errors detected during the writing of each register from its checkpoint copy cause recovery to abort to a checkstop. Successful completion of writing checkpoint values to SPRs, FPRs, and GPRs will result in restoring (step 391) the processor core to the system, e.g. by removing the gating (fencing) from the interface to L2 cache, NCU and memory 220 of FIG. 2, thus restoring the processor to the shared symmetric multiprocessing system resources. Pervasive logic may indicate or signal a high priority interrupt, such as a hypervisor maintenance interrupt (HMI) or a machine check (step 390) to the instruction completion unit (ICU) if a condition is detected which requires handling by host firmware or operating system prior to resuming normal workload. For example, if the error which caused recovery indicates the SLB contents may be compromised, the operating system must restore the SLB contents prior to executing instructions which require address translation. Such errors could be parity errors, multi-hit errors, or an "update window" error where an instruction which modifies the SLB progressed far enough to cause the update, but did not reach the checkpoint before an unrelated error triggered recovery, thus backing up to a checkpoint which does not include the instruction that caused the update to the SLB. SLB corruption is normally indicated via a high priority interrupt such as HMI. HMI is handled by hypervisor firmware, so cannot be taken while already under control of hypervisor firmware. Thus, in the special case of an SLB parity error while executing instructions under control of the hypervisor, a machine check is indicated, which is always taken, to prevent the hypervisor from repeatedly encountering the same parity error until eventually exceeding the recovery threshold. In addition, a machine check may direct handling of an unrecoverable error from storage.

IFU may restart instruction fetching (step 392) using the next instruction address (NIA) register. At this time, all formerly low-power circuits are allowed to return to the low-power state by discontinuing the overriding of clocks (step 393). Although it is likely that some number of these circuits will again be woken by a HMI or machine check interrupt being taken.

Avoidance of functional errors may occur at this point. A number of performance lowering execution modes (step 394) may be selected, which reduces the degree of complex superscalar multi-threaded pipelined instruction processing. Examples include, but are not limited to: single instruction dispatch; disable load look-aheads; disable branch look-aheads; precise exception mode (in-order serialized floating point execution) and disable pre-fetches. Collectively, the one or several modes that are selected comprise a reduced execution mode. At least one configuration register may select which modes are activated, and these predetermined modes may be set during machine initialization. A preprogrammed number of new groups of instructions are executed and check-pointed in the reduced execution mode. The number serves as a threshold. It should be noted that reduced execution mode has meaning only in relation to the normal execution mode, in the sense that the reduced execution mode adopts a processing mode that is generally slower alternative to one used in the normal execution mode, in relation to significant tracts of instructions executed over time. It is noted that there are occasional instances where branch-lookahead actually executes fewer instructions than a processor executing the same instructions without branch-lookahead as occurs when the prediction of a branch determination is guessed wrong by the processor. However, under long stretches of time, using an ordinary and routine set of instructions, a processor with branch-lookahead statistically outperforms the processor without branch-lookahead, all other computing resources being equal. Nevertheless, branch lookahead is considered a faster alternative to executing without branch lookahead. The same holds true for each of multiple instruction dispatch; load look-aheads; imprecise exception mode and pre-fetching-as compared to their mutually exclusive alternative modes.

Errors detected (step 395) after this point are handled by re-executing the steps that follow from the link "A" 302 on FIG. 3A, e.g., starting over. A certain number of instruction groups are counted with a checkpoint counter (step 396) when the checkpoint advances to include each group, to give the processor an opportunity to work through a rare instruction lineup or avoid a combination of rare machine states. Reaching the checkpoint threshold (step 397) of instruction group checkpoints causes a final restorative set of steps to occur as execution passes out the affirmative end of the decision diamond. Otherwise, groups of instructions continue to execute (step 396) provided no new errors are detected (step 395).

The final restorative steps may include clearing (step 388) the recovery count of the "recovery count threshold exceeded" (step 341) and "checkpoint count reached" (step 397) respectively. Also, normal execution mode (step 398) resumes, wherein normal execution mode may include one or more of the following: multiple instruction dispatch; load look-aheads; branch look-aheads; imprecise exception mode and pre-fetching or any other mode that purports, in the long run, to operate faster than a mutually exclusive alternative mode. At least one instruction group is executed in the normal execution mode.

The checkpoint count and checkpoint threshold, although not depicted in such detail in the flow diagram FIG. 3B, are implemented separately for each thread, and-separately for both hypervisor and non-hypervisor modes. Handling the HMI (presented by block 390) may cause hypervisor mode instructions to be executed when processing resumes, prior to returning to the non-hypervisor mode instruction sequence which encountered the error. Thus, to effectively avoid a situation which encountered a functional error, the reduced performance mode must be invoked for non-hypervisor mode as well. Once the checkpoint count has expired, i.e. met or exceeded the checkpoint threshold, for a thread in hypervisor mode, the signals which override normal performance mode execution are deactivated for that thread when in hypervisor mode. Simply stated, a thread must reach a first preprogrammed number of instruction groups in hypervisor mode. Independently, once the checkpoint count has expired for a thread in non-hypervisor mode, normal performance mode execution is resumed for that thread in non-hypervisor mode. Simply stated, a thread must reach a second preprogrammed number of instruction groups in non-hypervisor mode, wherein the first and second preprogrammed numbers can be zero or larger integers. The recovery count is cleared (step 388) only after the checkpoint count has expired for both hypervisor and non-hypervisor modes for both threads. Finally, also not shown in the flow diagram, if a thread is idle on entry to recovery, it will return to idle after handling the HMI, as it is not designated to execute any instructions. In this case, rather than extend the reduced performance window indefinitely, the checkpoint count is bypassed for the idle thread.

Thus we show how attempts may be made by a processor core and supporting circuitry to, among other things, drop into a reduced execution mode for a certain number of instructions and see if such attempts are sufficiently robust to avoid a rare line-up of events such that an error previously accounted with a group of instructions is avoided.

It is appreciated that many other modes may exist or be discovered that enable a processor to operate in a more aggressive, and potentially error prone mode. Collectively all such equivalents are normal execution modes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for recovery of a processor core in a chip of a symmetric multiprocessing system, the chip having a processor core and a host firmware for supervising resource allocation and error recovery, comprising the steps of:
    providing a clock signal to recovery circuits;
    blocking checkpointing of the processor core;
    quiescing a cache functional unit;
    establishing a coherent checkpoint in response to quiescing the cache functional unit;
    logically removing the processor core from the symmetric multiprocessing system in response to quiescing the cache functional unit and establishing a coherent checkpoint;
    resetting the processor core;
    restoring a nearest checkpoint to the processor core after resetting the processor core;
    indicating an interrupt in response to restoring a nearest checkpoint;
    executing a preprogrammed number of instruction groups in a reduced execution mode; and
    executing at least one instruction group in a normal execution mode.

2. The method of claim 1 for recovery of a processor core in a chip of a symmetric multiprocessing system further comprising the step of:
    isolating at least one error which may affect the result of a store conditional (STCX).

3. The method of claim 1 for recovery of a processor core in a chip of a symmetric multiprocessing system further comprising the step of:
    isolating at least one error which may affect the result of a cache-inhibited load.

4. The method of claim 1 for recovery of a processor core in a chip of a symmetric multiprocessing system further comprising the steps of:
    detecting an error which may affect retrieval of a next instruction address; and
    escalating to checkstop.

5. The method of claim 1 for recovery of a processor core in a chip of a symmetric multiprocessing system wherein the step of executing a preprogrammed number of instructions in a reduced execution mode comprises the step of executing the preprogrammed number of instructions according to an execution mode selected by a configuration register setting.

6. The method of claim 5 for recovery of a processor core in a chip of a symmetric multiprocessing system wherein the execution mode selected by the configuration register setting is selected from a group consisting of a single instruction dispatch; disable load look-aheads; disable branch look-aheads; in-order serialized floating point execution and disable pre-fetches.

7. The method of claim 1 for recovery of a processor core in a chip of a symmetric multiprocessing system further comprising the steps of:
    detecting an absence of an active system state modifying instruction after providing a clock signal to recovery circuits; and
    detecting that an error fails to contaminate a long duration instruction result, wherein a long duration instruction comprises one of a store conditional instruction or a cache-inhibited load instruction.

8. The method of claim 1 for recovery of a processor core in a chip of a symmetric multiprocessing system further comprising the steps of:
    detecting a presence of an active system state modifying instruction after providing a clock signal to recovery circuits;
    allowing a checkpoint to advance one instruction group;
    detecting that an error fails to contaminate a a long duration instruction result, wherein a long duration instruction comprises one of a store conditional instruction or a cache-inhibited load instruction; and
    wherein the step of blocking checkpointing is based on said detecting that an error fails to contaminate the long duration instruction result.

9. The method for recovery of a processor core in a chip of a symmetric multiprocessing system of claim 1, wherein the step of executing a preprogrammed number of instruction groups in a reduced execution mode comprises:
    executing a first preprogrammed number of instruction groups in a hypervisor mode; and
    executing a second preprogrammed number of instruction groups in a non-hypervisor mode.

10. A method for recovery of a processor core in a chip of a symmetric multiprocessing system, the chip having a processor core and a host firmware for supervising resource allocation and error recovery, comprising the steps of:
    providing a clock signal to recovery circuits;
    detecting a presence of an active long duration instruction, wherein the active long duration instruction comprises one of a store conditional or a cache-inhibited load instruction;
    allowing a checkpoint to advance one instruction group based on said detecting;
    determining whether an error may affect a result of the long duration instruction;
    blocking checkpointing in response to the determining that the error may affect a result of the long duration instruction
    quiescing a cache functional unit;
    establishing a coherent checkpoint in response to quiescing the cache functional unit;

logically removing the processor core from the symmetric multiprocessing system in response to quiescing the cache functional unit and establishing a coherent checkpoint;

resetting the processor core;

restoring a nearest checkpoint to the processor core after resetting the processor core;

indicating an interrupt;

executing a preprogrammed number of instruction groups in a reduced execution mode; and executing at least one instruction group in a normal execution mode.

11. The method for recovery of a processor core in a chip of a symmetric multiprocessing system of claim 10, wherein the step of resetting the processor core comprises resetting arrays in the processor core.

12. The method for recovery of a processor core in a chip of a symmetric multiprocessing system of claim 10, wherein the step of resetting the processor core comprises resetting latches in the processor core.

* * * * *